W. A. MARTIN.
PLOW FACING.
APPLICATION FILED JULY 21, 1913.
1,096,311.
Patented May 12, 1914.
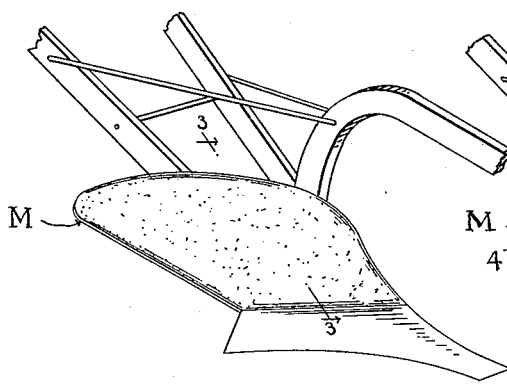
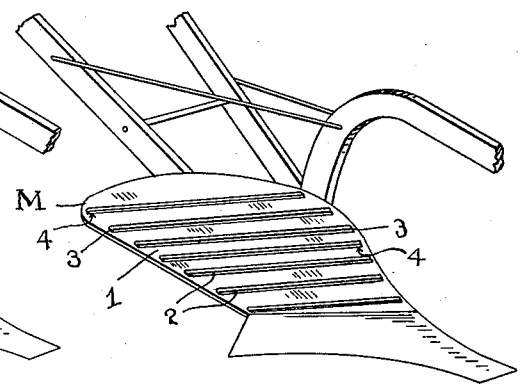
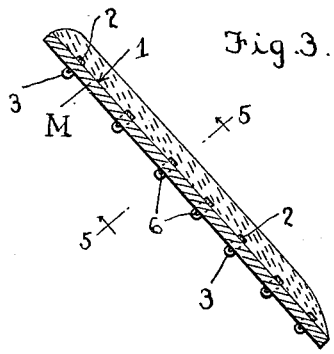
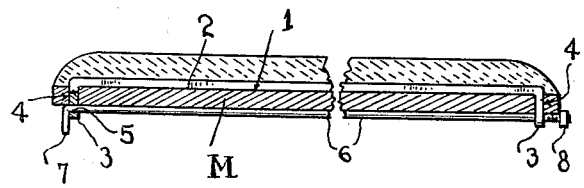
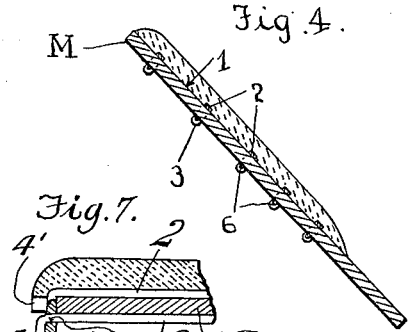
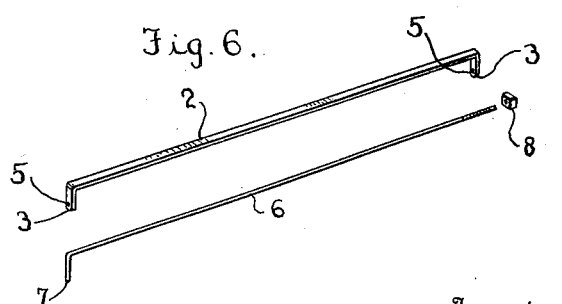
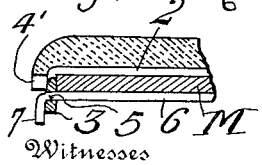
Witnesses
L. B. James
J. Ralph Hogg
Inventor
W. A. Martin
By H. B. Willson & Co.
Attorneys

UNITED STATES PATENT OFFICE.

WILLIAM A. MARTIN, OF WAXAHACHIE, TEXAS.

PLOW-FACING.

1,096,311.   Specification of Letters Patent.   Patented May 12, 1914.

Application filed July 21, 1913. Serial No. 780,279.

*To all whom it may concern:*

Be it known that I, WILLIAM A. MARTIN, a citizen of the United States, residing at Waxahachie, in the county of Ellis and State of Texas, have invented certain new and useful Improvements in Plow-Facings; and I do declare the following to be a full, clear, and exact description of the invention, such as will enable others skilled in the art to which it appertains to make and use the same.

This invention relates to plows, and more especially to the mold boards or shovels thereof.

It is well known that sticky soil of certain kinds will adhere to the face of the plow point, shovel, or mold board to such an extent as to gum up and render the implement practically useless after a short time, and to overcome the same the face of the exposed part is coated with plaster of Paris or similar plastic material which, while it remains, will shed the gummy soil and prevent sticking and balling.

In United States Patent Number 1058248 granted to me April 8, 1913, I have described and claimed a facing or coating for mold boards and the like which is held in place thereon by a rim removably secured to the mold board itself; and in United States Patent Number 1036675, issued to me August 27, 1912, I have described and claimed a plastic facing molded over a netting which is secured to the face of the mold board or the like.

The present invention is an improvement over both of these ideas, to the extent that I propose to reinforce the plastic facing by means of ribs disposed in preferably parallel relation to each other across the face of the mold board or other plow, and each independently connected therewith so that it may be removed when desired. This and other objects are carried out by the construction hereinafter more fully described and claimed and shown in the drawings wherein:

Figure 1 is a perspective view of the plow and mold board complete, and Fig. 2 a similar view before the plastic material has been applied to the ribs. Fig. 3 is a vertical sectional view through the mold board with all of the ribs and plastic material in place, and Fig. 4 a similar section with a few of the lowermost ribs and the lower portion of the plastic material removed. Fig. 5 is a cross section through the mold board, and Fig. 6 is a perspective detail of the metallic parts of this device. Fig. 7 is a sectional detail similar to Fig. 5 showing a slight modification.

I have illustrated and will herein describe a mold board M, although I wish it to be understood that this invention is applicable to any active part of any type of plow, as well as to some kinds of cultivators and the like. The purpose is, as above stated, to coat the working face of such part with plaster of Paris or similar plastic material, to which waxy or sticky soil will not adhere, although the coating or facing will in time wear off. To prevent this wearing away, I preferably reinforce the facing 1 with transverse ribs or strips 2 of metal which overlie the face of the mold board M and have their ends 3 inturned and passing through openings in the mold board and pierced with eyes 5 parallel with the rear face of such board. These openings in the mold board may be holes 4 through it as shown in Fig. 5 or notches 4' in its edges as shown in Fig. 7. Through each pair of eyes is passed a pin 6 preferably having its upper end bent or otherwise formed into a handle 7 and its lower end threaded to receive a nut 8, although such nut might be omitted and any suitable fastening device for the pin employed. In facing a mold board with this coating I would apply all the strips and then smear or plaster over the mold board and the strips with the plaster of Paris or other plastic material of the proper consistency and to the proper thickness. After the same has dried and set, the plow can be used as will be well understood. In time, the lower portion of the facing will wear away until perhaps the ribs or strips at the bottom are exposed, or so little of the plastic material remains that it does not longer form a "cling" and the remainder of the plastic material falls away. The facing at the lower edge of the plow or mold board is then broken off, the lowermost key or pin removed, and the strip withdrawn; and if the edge of the facing that remains is beveled off a little the plow can still be used for a considerable time. This action is repeated for the next to the lowermost strip, and then the next, but finally a point will be reached where enough of the metal face of the mold board M is exposed to permit the soil to cling, and then the strips must be replaced and keyed or pinned in position and the lower portion of the mold board re-faced with the plastic material in the manner above described.

This invention possesses the advantage that it is applicable to mold boards already in use, by simply forming the holes or eyes through them as above described and attaching the device in the manner already set forth. It is further of advantage to the farmer who may have two or three different kinds of soil on his farm, because if he is to plow in rocky or sandy soil he can remove the facing as a whole as it will easily come off by reason of the fact that it is reinforced with a number of transverse strips. In that case I would remove all the keys and gently push the bent ends of the strips up from the mold board so that eventually the entire facing could be taken off and the plow used in the ordinary manner.

I do not wish to be limited to plaster of Paris particularly, as any suitable plastic material or cementitious composition may be employed which will produce the end desired. Nor do I care to be limited to the number and precise disposition of the strips, and the fastening means therefor.

What is claimed as new is:

1. The combination with a mold board, of a series of strips overlying the face thereof and independently and detachably connected with said board, and a plastic facing molded around and entirely covering said strips.

2. The combination with a mold board, of a series of strips overlying the face thereof and disposed in parallelism and along horizontal lines, means for detachably connecting each strip with the mold board, and a facing of plastic material molded around said strips.

3. The combination with a mold board having in it a series of pairs of openings; of a series of metallic strips overlying the face of the mold board and each having both ends bent to the rear at points adapted to pass through a pair of said openings, and the rearwardly bent ends pierced with eyes, fastening means removably engaging said eyes, and a plastic facing molded around said strips.

4. The combination with a mold board having through it a series of pairs of openings; of a series of metallic strips overlying the face of the mold board and each having both ends bent to the rear at points adapted to pass through said openings and the rearwardly bent ends pierced with eyes, a pin for each strip passing through both said eyes and having a handle at one end and its other end threaded, a nut removably engaging said threads, and a plastic facing molded around said strips.

5. The combination with a mold board having in it a series of pairs of openings, the members of each pair being disposed in horizontal alinement; of a series of metallic ribs overlying the face of said mold board and having rearwardly bent extremities adapted to pass through said openings, means for detachably fastening each pair of said extremities in place independently of all others, and a plastic facing molded around said strips.

6. The combination with a mold board having through it a series of pairs of holes; of a series of ribs overlying the face of said mold board and having rearwardly bent extremities adapted to pass through said holes, means for detachably fastening each pair of said extremities in place independently of all others, and a plastic facing molded around said strips.

In testimony whereof I have hereunto set my hand in presence of two subscribing witnesses.

WILLIAM A. MARTIN.

Witnesses:
JACK BEALL,
R. T. PHILLIPS.